United States Patent

[11] 3,622,855

[72] Inventors David M. Hodgin
Cedar Rapids;
Leonard J. Petska, Cedar Rapids; Ferman L. Walker, Cedar Rapids; Robert H. Pool, Marion, all of Iowa
[21] Appl. No. 60,470
[22] Filed Aug. 3, 1970
[45] Patented Nov. 23, 1971
[73] Assignee Collins Radio Company
Cedar Rapids, Iowa

[54] DIGITAL CONTROL DEVICE
2 Claims, 1 Drawing Fig.
[52] U.S. Cl. .................................................. 318/603
[51] Int. Cl. ........................................... G05b 19/28
[50] Field of Search............................................ 318/603, 601, 571, 602

[56] References Cited
UNITED STATES PATENTS
| | | | |
|---|---|---|---|
| 3,414,787 | 12/1968 | Reuteler et al. ............. | 318/603 X |
| 3,465,217 | 9/1969 | Kress............................ | 318/601 |
| 3,002,115 | 9/1961 | Johnson et al. ............. | 318/571 X |
| 3,512,060 | 5/1970 | Floyd .......................... | 318/603 |
| 3,539,896 | 11/1970 | Reuteler et al. ............. | 318/571 |

Primary Examiner—Benjamin Dobeck
Attorneys—Robert M. Sperry and Robert J. Crawford ABSTRACT: This invention relates to control means for accurately controlling the amount and rate of change of a device to be controlled. The invention contemplates a digital input device which receives a digital command, either manually or from a computer; compares the command with a signal from a position sensing mechanism; and generates an "error" signal which is applied to correctly position the controlled device.

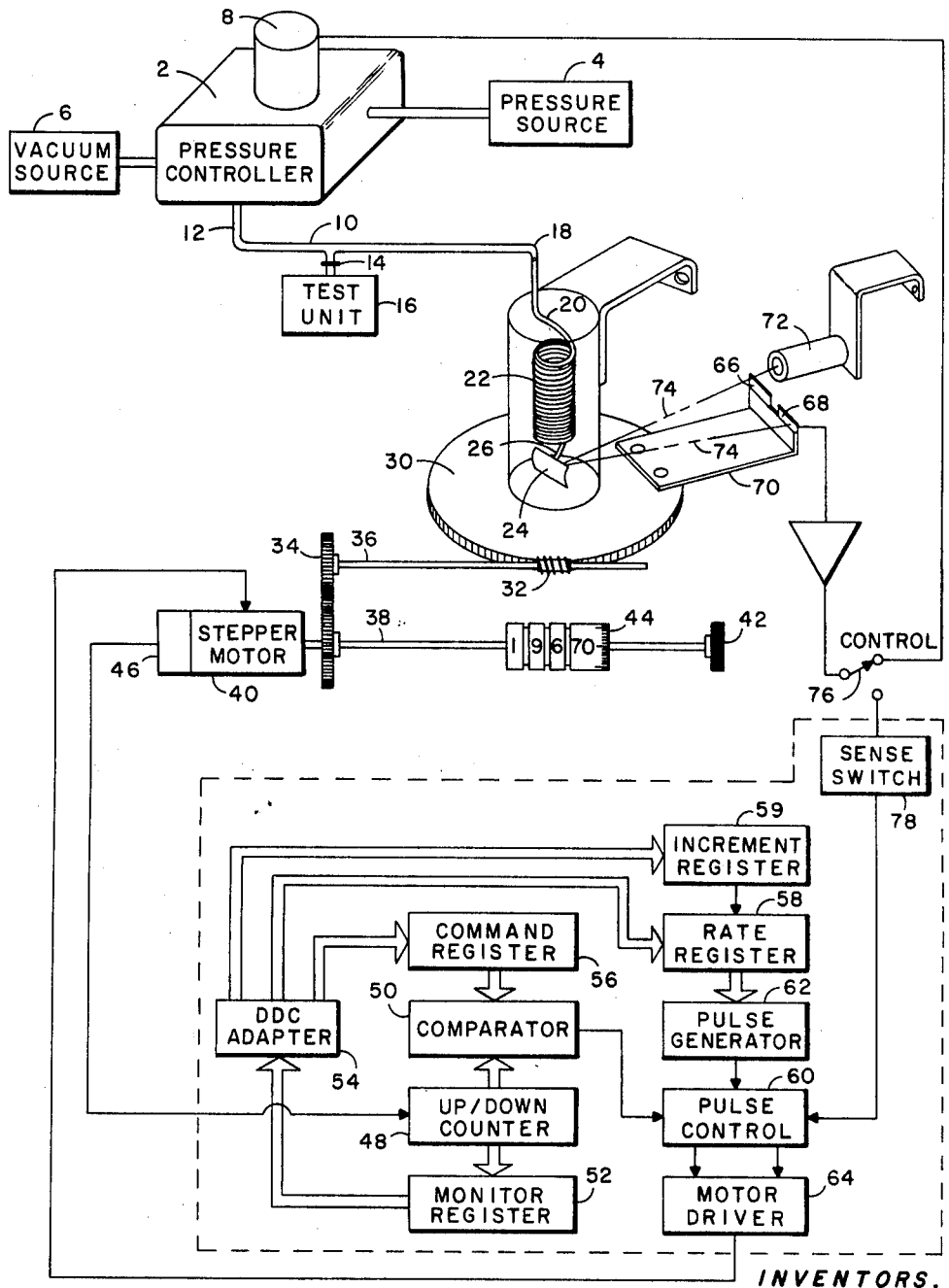

DIGITAL CONTROL DEVICE

This invention relates to control means and is particularly directed to digital means for accurately controlling the amount and rate of change of a device to be regulated.

The increasingly widespread use of automated equipment has developed a requirement for a control mechanism capable of receiving digital commands from a computer and controlling the operation of a machine tool or the like in response to such commands. At the same time the demands for speed and accuracy of such control are becoming increasingly severe. Many attempts have been made heretofore to solve these problems manually or through the use of analog servo mechanisms. Unfortunately, manual operation is too slow, and analog systems do not lend themselves to control by digital computers.

These disadvantages of the prior art are overcome with the present invention and digitally controlled means are provided for regulating machine operation in a rapid and accurate manner. It is also possible, with the device of the present invention to vary the slew rate while traversing the controlled machine from one position to another.

The advantages of the present invention are preferably attained by providing variable speed drive means for moving a device to be controlled, position sensing means for sensing movement of said device from a given position, a digital regulating device supplied either manually or electronically with a digital command signal indicative of the desired amount of change and the desired rate of transition to be employed in attaining the desired change. The regulating device compares the command signal with a signal from the position sensing means and generates a drive signal which is applied to cause the variable speed drive means to reposition the controlled device at the desired rate.

Accordingly, it is an object of the present invention to provide improved control means for automatic equipment.

Another object of the present invention is to provide digitally actuated control means for automatic equipment.

A further object of the present invention is to provide computer regulated control means for automatic equipment.

A specific object of the present invention is to provide digital control means comprising variable speed drive means for moving a device to be controlled, position sensing means for sensing movement of the controlled device from a given position, a digital regulating device supplied either manually or electronically with a digital command signal indicative of the desired amount of change and the rate of transition to be employed in attaining the desired change and serving to compare the command signal with a signal from the position sensing means and generating a drive signal to cause the drive means to reposition the controlled device at the desired rate.

These and other objects and features of the present invention will be apparent from the following detailed description taken with reference to the accompanying drawing.

In the drawing:

The FIGURE is a diagrammatic representation of a fluid pressure regulating device embodying the present invention.

In that form of the present invention chosen for purposes of illustration the drawing shows a pressure controller 2 coupled to a fluid pressure source 4 and a vacuum source 6 and provided with electrosensitive means 8 for regulating the fluid pressure to be established in conduit 10. Conduit 10 has one end 12 thereof connected to pressure controller 2 and is provided with a coupling 14 for connecting a test unit 16 for application of the fluid pressure determined by pressure controller 2. The remaining end 18 of conduit 10 is connected to one end 20 of a Bourdon tube 22 which carries a reflective member, such as mirror 24, mounted adjacent its free end 26. A precision worm gear 30 is mounted in proximity with mirror 24. A worm meshes with gear 30 and is coupled, through gearing 34 and shafts 36 and 38 in mutual-driving relation with stepping motor 40 and manual setting means 42. Shaft 38 also drives suitable indicia 44 which may be calibrated to represent the position of worm gear 30 in terms of simulated altitude, pressure, or the like. Encoder 46 is coupled to stepping motor 40 and serves to generate a digital signal indicative of the position of worm gear 30 and supplies this digital signal to an UP-DOWN counter 48 which, in turn, supplies the signal to comparator circuit 50 and monitor register 52. A digital input device 54, which may be operated manually or by computer, provides first, second, and third digital words which are applied respectively, to command register 56, rate register 58, and increment register 59 to indicate the desired pressure, the rate of change to be employed in achieving the desired pressure, and the increment of rate adjustment with time. Command register 56 passes the first digital word to comparator circuit 50 which compares the value of the desired pressure with the signal from UP-DOWN counter 48 and generates a difference signal which is applied to pulse control means 60. Meanwhile, rate register 58 passes the second digital word to pulse generator 62 which generates pulses at the desired rate and passes these pulses to pulse control means 62 and, thence, to motor driver 64 which serves to move stepping motor 40 in the appropriate direction at the desired rate. A pair of photoresponsive elements 66 and 68 are mounted in spaced relation on a bracket 70 which is carried by gear 30 and a collimated light source 72 is position to cause a beam of light, indicated by dashed lines 74, to be reflected from mirror 24 toward the photoresponsive elements 66 and 68 which are connected to generate appropriate signals which are applied through switch 76 to either sense switch 78 and pulse control means 60 or to the electrosensitive means 8 on pressure controller 2.

In control operation the digital input device 54 is provided, either manually or by computer, with three digital words. One of these digital words defines the desired pressure, another word defines the rate of change at which the desired pressure is to be attained, and the third word defines increment of pressure rate adjustment with time. The "pressure" word is applied to the command register 56 and, thence, to comparator circuit 50. The comparator circuit 50 compares the value of the desired pressure with the present pressure value, as indicated by encoder 46 through UP-DOWN counter 48, and generates a difference signal which is applied to pulse control circuit 60. Meanwhile, the digital input device 54 applies the "rate" word to rate register 58 which, in turn, applies this word to cause pulse generator 62 to emit pulses at the rate defined by the "rate" word. The pulses from pulse generator 62 are passed to pulse control circuit 60 and, so long as comparator circuit 50 is providing a difference signal, the pulse control circuit 60 passes the pulses from pulse generator 62 to motor driver 64 which drives stepper motor 40 and, through gearing 34, shaft 36, and worm 32, rotates worm gear 30. The movement of worm gear 30 results in similar movement of bracket 70 and, hence, of photoresponsive elements 66 and 68. This causes one of the photoresponsive elements 66 or 68 to intercept light beam 74 and sends a signal through switch 76. When switch 76 is in the "control" position, this signal is applied to the electrosensitive means 8 of pressure controller 2 to appropriately vary the fluid pressure in conduit 10. This change of fluid pressure in conduit 10 is applied to test unit 16 and, simultaneously, to Bourdon tube 22 which serves to reposition mirror 24. The rate and sign of the pressure change effected by pressure controller 2 is determined by the magnitude and direction of displacement of light beam 74 from the slot between photoresponsive elements 66 and 68. When gear 30 has reached the position corresponding to the desired pressure, the value of the signal provided by encoder 46 through UP-DOWN counter 48 to comparator circuit 50 will equal the "pressure" word supplied to comparator circuit 50 by the digital input device 54 through command register 56. When this occurs, comparator circuit 50 will stop sending a difference signal to pulse control circuit 60 to halt the flow of pulses from pulse generator 62 to motor driver 64 and, thereby, to prevent further movement of stepper motor 40 and gear 30. Thereafter, as pressure controller 2 establishes the desired fluid pressure in conduit 10, Bourdon tube 22 will cause mirror 24 to reflect light beam 74 into the slot between photoresponsive elements 66 and 68. This stops the signal from the elements 66 and 68 to electrosensitive means 8 and causes pressure controller 2 to maintain the desired pressure.

It will be seen that the pulse control circuit 60 serves as a gate which is actuated by comparator circuit 50 to pass pulses from pulse generator 62 to motor driver 64 only when a pressure change is required. However, the rate of change is controlled, independently, by the pulse generator 62 in the manner dictated by the digital "rate" word supplied by the digital input device 54 through the rate register 58. Consequently, the rate-of-change may be varied in any desired manner, while traversing from one pressure to another, by supplying appropriate "rate" words to the rate register 58.

The pressure rate may be varied incrementally to produce pressure rates of change that simulate linear altitude or air speed rate of change. The degree of pressure rate change is dictated by the increment word supplied to the increment register 59 by the digital input device 54. Increment register 59 passes signals to rate register 58 which serve to increase or decrease the pressure rate word by one unit at the time interval dictated by the digital command word supplied to increment register 59 by the digital input device 54.

For monitor operations switch 76 is placed in the "monitor" position, while digital input device 54 supplies rate register 58 with any suitable "rate" word. The unknown pressure existing in Bourdon tube 22 causes mirror 24 to rotate. Any difference between the actual position of the light beam 74 reflected by mirror 24 and the center of photoresponsive elements 66 and 68 will cause a signal to be applied through switch 76 to sense switch 78 which applies a signal to cause pulse control circuit 60 to pass pulses from pulse generator 62 to motor driver 64 to cause movement of stepper motor 40, and which determines the direction of such movement needed to realign light beam 74 with the slot between photoresponsive elements 66 and 68. This movement continues until the error signal is "nulled out." At this time, the UP-DOWN counter 48, having been up-dated by encoder 46, contains the pressure value actually existing in conduit 10. This value can be transmitted by monitor register 52 to the computer for evaluation and appropriate action. In addition, indicia 44 will now indicate the new pressure existing in conduit 10 and test unit 16.

Obviously the digital control device of the present invention may be readily adapted to control the movements of other automatic equipment, such as machine tools. In addition, numerous variations and modifications may be made without departing from the present invention. Accordingly it should be clearly understood that the form of the present invention described above and shown in the accompanying drawing is illustrative only and is not intended to limit the scope of the present invention.

What is claimed is:
1. A digital control device comprising:
   drive means for driving a device to be controlled,
   encoder means coupled to said drive means and operative to generate a digital signal indicative of the position of said controlled device,
   digital input means for supplying a digital command signal indicative of a desired position and a desired rate of change,
   comparison means for comparing said command signal with said signal from said encoder and generating a drive signal to actuate said drive means,
   said comparison means comprising:
   a command register connected to receive the position control portion of said command signal,
   an UP-DOWN counter connected to receive said signal from said encoder means,
   a comparator circuit connected to compare the signal held by said command register with the signal held by said counter and operative to generate an appropriate difference signal,
   a rate register connected to receive the rate-of-change portion of said command signal,
   a variable rate pulse generator operative to generate pulses at a rate determined by the signal held by said rate register,
   motor driver means operable to drive said stepping motor, and
   pulse control means connected to receive said difference signal and responsive thereto to control passage of pulses from said pulse generator to said motor driver means.
2. The device of claim 1 further comprising:
   an increment register connected to receive that portion of said command signal indicative of increment of rate adjustment with time and serving to appropriately adjust the value held by said rate register.

* * * * *